United States Patent [19]
Torbett

[11] 4,174,810
[45] Nov. 20, 1979

[54] SAFETY NOZZLE AND RACK

[76] Inventor: Edward L. Torbett, Rte. 2, P.O. Box 272A, Piney Flats, Tenn. 37686

[21] Appl. No.: 842,519

[22] Filed: Oct. 17, 1977

[51] Int. Cl.² .............................................. B05B 15/06
[52] U.S. Cl. ..................................... 239/283; 248/75
[58] Field of Search ............... 239/273, 280, 282, 283, 239/288; 248/75, 76, 79, 89

[56] References Cited
U.S. PATENT DOCUMENTS

| | | | |
|---|---|---|---|
| 2,799,533 | 7/1957 | Bachli et al. | 239/282 |
| 3,119,587 | 1/1964 | Anderson | 248/75 |

FOREIGN PATENT DOCUMENTS 328374  3/1958  Switzerland ................................ 248/79

Primary Examiner—Robert W. Saifer

[57] ABSTRACT

A pressurized safety nozzle and storage rack assembly comprising a substantially rigid tubular fluid conduit having an enlarged diameter portion adjacent its outlet end, and a rack having a nozzle support and anti-kickback semicollar feature which substantially surrounds the conduit and is adapted to engage the enlarged portion thereof and prevent accidental axial withdrawal of the nozzle from the rack when fluid pressure is applied to the nozzle.

3 Claims, 4 Drawing Figures

SAFETY NOZZLE AND RACK

This invention relates to an anti-kickback, safety nozzle and storage rack which may be employed in car washes and other such installations where a spray nozzle for pressurized fluid is hand-held during operation.

In installations such as coin operated car washes, a hand-held nozzle is employed by the customer for the washing, rinsing, and waxing operations. The nozzle is usually stored on a support of some kind in a convenient position for the customer. Such means as an electrical switch usually in the form of a coin chute is provided to activate the washing mechanism and provide pressurized water to the nozzle via a suitable flexible hose. Normally, a customer would be alert to the fact that he must firmly grasp the nozzle prior to activation of the washing mechanism; however, error in this respect is not uncommon. In such an event, the reverse mechanical action takes over and literally flings the nozzle, which is usually metal, around and typically damages both the automobile and the customer.

Objects of the present invention, therefore, are to provide a novel pressure nozzle and storage rack which greatly reduces the possibility of harm as the result of negligent handling of the nozzle by an operator, and to provide such nozzle and rack with such configuration as to allow them to be used in an essentially trouble free, convenient manner.

These and other objects hereinafter appearing have been attained in accordance with the present invention through the novel construction wherein the nozzle comprises a tubular member having an enlarged diameter portion, and wherein the storage rack has a nozzle support and anti-kickback semicollar feature which is adapted to engage said enlarged portion of said nozzle and prevent axial withdrawal thereof from the rack when fluid pressure is applied to the nozzle.

The invention is more particularly explained by the following description and drawings wherein.

Figure 1:
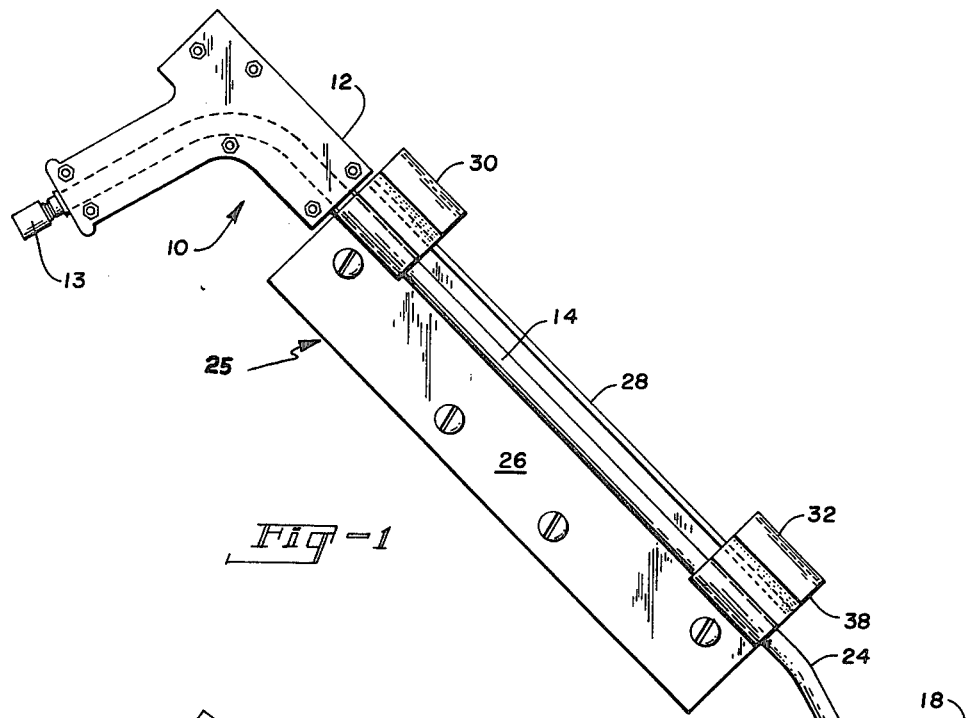
FIG. 1 is a side view of the nozzle and rack in partial cross-section.

Referring to the drawings, the unique safety nozzle generally designated 10 comprises a convenient handle 12 from which the fluid inlet adaptor 13 extends, extension conduit 14, nipple 16 and a shroud generally designated 18. The actual details and materials (metal or plastic) of construction of these parts of the nozzle may be greatly varied and many useful nozzles are available. Conduit 14 preferably is curved as shown at 24 toward the outlet end to allow convenient aiming of the spray and for safety reasons explained below. Nipple 16 may be of the adjustable type to allow regulation of the outlet stream diameter.

The structural features of the present nozzle which are particularly important here, however, are the enlarged diameter portion or shroud 18 and the axially angled outlet end of the conduit. The shroud is tightly secured to conduit 14, for example, by threading, and may be constructed of any fairly strong material but preferably consists of a rubber or elastomeric plastic shield 20 secured to a threaded bushing 22. Shield 20 preferably extends axially to at least the outer end of nipple 16 such that inadvertent striking of the nipple against the automobile by the operator is unlikely.

Figure 2:
FIG. 2 is a side view of the nozzle and rack in their anti-kickback operative relationship.
Figure 3:
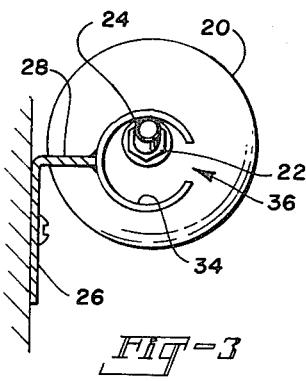
FIG. 3 is a cross-sectional view taken along line 3—3 of FIG. 2 in the direction of the arrows.
Figure 4:
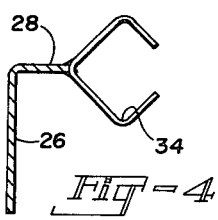
FIG. 4 is a variation in shape of the semi-collar of FIG. 3.

The storage rack (metal or plastic) generally designated 25 comprises a base 26 adapted for securing to any substantially vertical surface, preferably at a downward slanting angle as shown, such as a wall of the car wash. A lip 28 extending outwardly carries nozzle supports comprising semi-collars 30 and 32. These supports which are preferably substantially circular, elliptical or diamond shaped with any long axis disposed generally vertically, may be combined into a single long support or divided up into two or more separate supports. The important feature is that the supports have a deep lower cradle portion 34, a large, relatively unobstructed loading gap 36, and a semi-collar abutment 38 consisting of the forward edge of the support 32. The diameters of the semi-collar 38 and shield 20 are such that the collar will block axial retraction of nozzle 10 beyond the position shown in FIG. 2 in the event that the wash mechanism is inadvertently activated before the operator has firmly grasped the nozzle. It is noted that the reverse action of the pressurized water ejecting from nipple 16 will force the forward portion of the nozzle upwardly and rearwardly as shown in FIG. 2 due to the angled axis of the forward portion. The upper cradle portion of support 32 will thereupon receive the forward portion of conduit 14 in a semi-locking manner to retain it firmly within the support even under the violent agitation of the ejecting water.

It is apparent that the present invention provides a convenient and safe means for the storage of fluid ejector nozzles and essentially eliminates the possibility of losing control of the nozzle through premature activation of the washing mechanism.

The invention has been described in detail with particular reference to preferred embodiments thereof, but it will be understood that variations and modifications can be effected within the spirit and scope of the invention.

I claim:

1. A safety nozzle and storage rack assembly for pressurized fluids comprising an elongated conduit having enlarged shoulder means adjacent its outlet extending radially outwardly from the longitudinal axis of said conduit, said conduit being adapted for connection to a source of pressurized fluid, semi-collar means substantially axially surrounding and supporting said conduit proximate to said shoulder means and having a substantially horizontally disposed loading gap lying substantially above the axis of said conduit when said conduit is resting within said semi-collar means, said semi-collar means having an average diameter less than that of said shoulder means such that axial retraction of said conduit from said semi-collar means by the reverse action from fluid ejected from said outlet is prevented.

2. The safety nozzle of claim 1 wherein said outlet end of said conduit is axially angled.

3. A safety nozzle for use in the assembly of claim 1, said nozzle comprising an elongated fluid conduit having a handle on its inlet end and a resilient, radially extending shoulder means adjacent its outlet end, said conduit having a bend at an intermediate longitudinal portion thereof such as to dispose said outlet end below the longitudinal axis of that portion of said conduit which extends from and which is adjacent said handle.

* * * * *